(12) United States Patent
Sakurai et al.

(10) Patent No.: US 12,236,227 B2
(45) Date of Patent: Feb. 25, 2025

(54) VEHICLE DATA COMMUNICATION DEVICE, CENTER DEVICE, DATA COMMUNICATION METHOD, AND COMPUTER-READABLE NON-TRANSITORY TANGIBLE STORAGE MEDIUM

(71) Applicant: DENSO CORPORATION, Kariya (JP)

(72) Inventors: Nao Sakurai, Kariya (JP); Hideo Yoshimi, Kariya (JP)

(73) Assignee: DENSO CORPORATION, Kariya (JP)

( * ) Notice: Subject to any disclaimer, the term of this patent is extended or adjusted under 35 U.S.C. 154(b) by 102 days.

(21) Appl. No.: 17/901,949

(22) Filed: Sep. 2, 2022

(65) Prior Publication Data

US 2022/0413838 A1    Dec. 29, 2022

Related U.S. Application Data

(63) Continuation of application No. PCT/JP2021/007691, filed on Mar. 1, 2021.

(30) Foreign Application Priority Data

Mar. 6, 2020 (JP) ................. 2020-038735

(51) Int. Cl.
*G06F 9/44* (2018.01)
*G06F 8/65* (2018.01)
(Continued)

(52) U.S. Cl.
CPC ............... *G06F 8/65* (2013.01); *H04L 41/20* (2013.01); *H04L 67/34* (2013.01)

(58) Field of Classification Search
CPC ....................................... G06F 8/65
(Continued)

(56) References Cited

U.S. PATENT DOCUMENTS 9,225,782 B2 * 12/2015 Addepalli ......... H04W 52/0219
9,529,580 B2 * 12/2016 Vangelov ............. H04L 67/563
(Continued)

FOREIGN PATENT DOCUMENTS

JP    2006295563 A    10/2006
JP    2008193572 A     8/2008
(Continued)

*Primary Examiner* — Evral E Bodden
(74) *Attorney, Agent, or Firm* — Harness, Dickey & Pierce, P.L.C.

(57) ABSTRACT

A vehicle data communication device mounted in a vehicle having a plurality of ECUs. The vehicle data communication device wirelessly communicates data with a center device. The vehicle data communication device comprises: a plurality of communication clients each pairing with a respective one of a plurality of distribution servers included in the center device; a communication information acquisition unit acquiring information of a communication carrier and a region where the center device is located; a client storage unit storing the plurality of communication clients each of which corresponds to the corresponding one of the plurality of distribution servers; and a client selection unit (i) selecting one of the plurality of communication clients that corresponds to the communication carrier and the region that are specified by the information and (ii) activating the selected one of the plurality of communication clients to enable data communication with the corresponding distribution server.

9 Claims, 13 Drawing Sheets

(51) Int. Cl.
*H04L 41/00* (2022.01)
*H04L 67/00* (2022.01)

(58) Field of Classification Search
USPC .......................................................... 717/168
See application file for complete search history.

(56) References Cited

U.S. PATENT DOCUMENTS

| | | | |
|---|---|---|---|
| 10,235,154 B2* | 3/2019 | Vangelov | G06F 8/65 |
| 10,924,901 B2* | 2/2021 | Karlsson | H04W 4/42 |
| 11,036,484 B2* | 6/2021 | Miller | G06F 8/71 |
| 11,144,296 B2* | 10/2021 | Rodriguez Bravo | H04L 9/0637 |
| 2008/0219274 A1 | 9/2008 | Kato et al. | |
| 2009/0215446 A1 | 8/2009 | Hapsari et al. | |
| 2011/0307882 A1 | 12/2011 | Shiba | |
| 2012/0116633 A1 | 5/2012 | Kato et al. | |
| 2022/0167262 A1* | 5/2022 | Ding | H04L 67/55 |

FOREIGN PATENT DOCUMENTS

| | | | |
|---|---|---|---|
| JP | 2008227580 A | 9/2008 | |
| JP | 2014036340 A | 2/2014 | |
| JP | 2018116400 A | 7/2018 | |
| WO | WO-2010113348 A1 | 10/2010 | |

\* cited by examiner

FIG. 10

BEFORE CONVERSION
OTA CLIENT 1 (COMPANY F)

| | SIZE (BYTE) | VALUE |
|---|---|---|
| REWRITING ENVIRONMENT | 1 | 0x00: REWRITING WHEN PARKING<br>0x01: REWRITE DURING MOVING |
| POWER CONTROL INFORMATION | 1 | 0x00: WITH IG-ON<br>0x01: WITHOUT IG-ON |
| ACTIVATION INFORMATION | 1 | 0x00: ECU RESET<br>0x01: IG-OFF. ON |
| DTC CLEAR TRANSMISSION SETTING | 1 | 0x00: WITH TRANSMISSION<br>0x01: WITHOUT TRANSMISSION |
| SIZE OF PROGRAM FOR UPDATING | 4 | LENGTH OF REPRO DATA FOR UPDATING |
| DATA RECOGNITION | 1 | 0x0a: FULL DATA<br>0x0b: FULL DIFFERENT DATA<br>0x0c: PART OF DATA<br>0x0d: PART OF DIFFERENT DATA |

AFTER CONVERSION
OTA CLIENT 2 (COMPANY E)

| | SIZE (BYTE) | VALUE |
|---|---|---|
| POWER CONTROL INFORMATION | 1 | 0x00: WITH IG-ON<br>0x01: WITHOUT IG-ON |
| ACTIVATION INFORMATION | 1 | 0x00: ECU RESET<br>0x01: IG-OFF. ON |
| REWRITING ENVIRONMENT | 1 | 0x00: REWRITING WHEN PARKING<br>0x01: REWRITE DURING MOVING |
| DTC CLEAR TRANSMISSION SETTING | 1 | 0x00: WITH TRANSMISSION<br>0x01: WITHOUT TRANSMISSION |
| SIZE OF PROGRAM FOR UPDATING | 4 | LENGTH OF REPRO DATA FOR UPDATING |
| DATA RECOGNITION | 1 | 0x0a: FULL DATA<br>0x0b: FULL DIFFERENT DATA<br>0x0c: PART OF DATA<br>0x0d: PART OF DIFFERENT DATA |
| NUMBER OF TARGET ECU | 1 | 0x03: NUMBER OF TARGET ECU INCLUDED IN PACKAGE |

(1) CHANGING ORDER
(2) CHANGING DATA VALUE
(3) ADDING ITEM

FIG. 13

| VEHICLE | | SERVER |
|---|---|---|
| | | KPI |
| VEHICLE A | | INSTALL 2018/12/03 |
| VEHICLE B | | UPDATE 2018/12/12 |
| VEHICLE C | | UPDATE 2018/12/20 |

↑ MERGE (DISPLAYING LATEST PHASE AS KPI)

| VEHICLE | | SERVER | |
|---|---|---|---|
| | | G COMPANY | F COMPANY | E COMPANY |
| VEHICLE A | | INSTALL 2018/12/03 | | |
| VEHICLE B | | | INSTALL 2018/12/01 | UPDATE 2018/12/12 |
| VEHICLE C | | UPDATE 2018/12/20 | | DOWNLOAD 2018/11/21 |

VEHICLE DATA COMMUNICATION DEVICE, CENTER DEVICE, DATA COMMUNICATION METHOD, AND COMPUTER-READABLE NON-TRANSITORY TANGIBLE STORAGE MEDIUM

CROSS REFERENCE TO RELATED APPLICATION

The present application is a continuation application of International Patent Application No. PCT/JP2021/007691 filed on Mar. 1, 2021, which designated the U.S. and claims the benefit of priority from Japanese Patent Application No. 2020-038735 filed on Mar. 6, 2020. The entire disclosures of all of the above applications are incorporated herein by reference.

TECHNICAL FIELD

The present disclosure relates to a vehicle device, a center device, a data communication method, and a computer-readable non-transitory tangible storage medium.

BACKGROUND ART

The scale of application programs for vehicle control, diagnosis, and the like, installed in an electronic control unit of a vehicle has been increased due to the diversification of vehicle control.

SUMMARY

A vehicle data communication device is mounted in a vehicle having a plurality of electronic control units. The vehicle data communication device is configured to wirelessly communicate data with a center device. The vehicle data communication device includes: a plurality of communication clients each pairing with a respective one of a plurality of distribution servers included in the center device; a communication information acquisition unit acquiring information of a communication carrier and a region in which the center device is located via wireless communication using a line of the communication carrier; a client storage unit storing the plurality of communication clients each of which corresponds to the corresponding one of the plurality of distribution servers; a client selection unit (i) selecting, from the client storage unit based on the information acquired by the communication information acquisition unit, one of the plurality of communication clients that corresponds to the communication carrier and the region that are specified by the information and (ii) activating the selected one of the plurality of communication clients to enable data communication with the corresponding distribution server; and a communication control unit controlling transition between a plurality of phases in data communication with the distribution server, the plurality of phases including: (1) checking data update; (2) downloading update data; (3) installing by writing downloaded data into the electronic control units; and (4) activating installed data. The selected communication client is configured to acquire, based on the plurality of phases, update data to be written into the plurality of electronic control units when activated by the client selection unit.

BRIEF DESCRIPTION OF DRAWINGS

The above and other objects, features and advantages of the present disclosure will become more apparent from the following detailed description made with reference to the accompanying drawings.

FIG. 10 is a diagram illustrating an example of the format conversion of metadata;
FIG. 13 is an image illustrating a process of merging OTA implementation phase data for each of the vendors.

DESCRIPTION OF EMBODIMENTS

Figure 1:
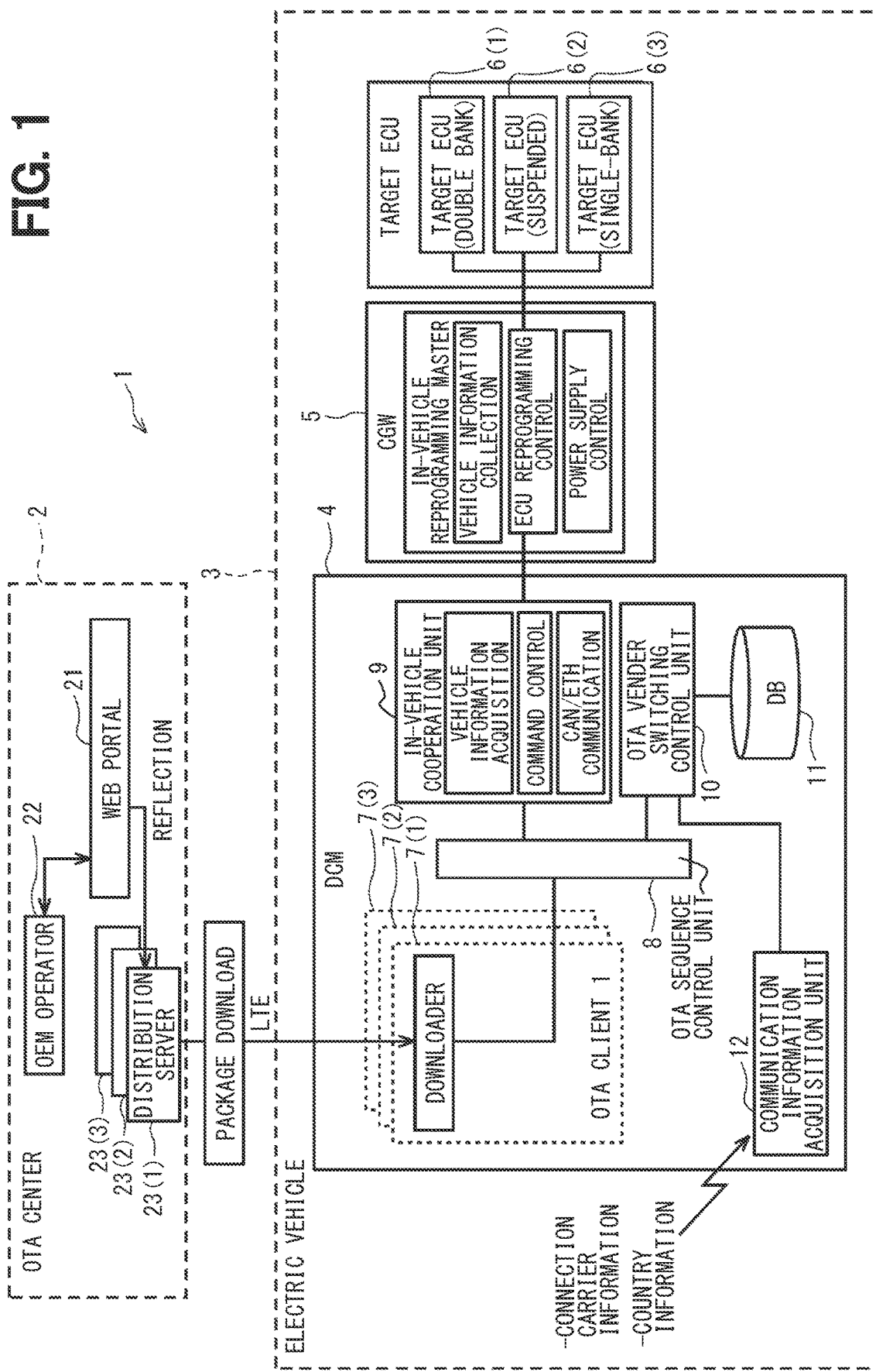
FIG. 1 is a circuit diagram showing a configuration of a multiple over-the-air (OTA) vendors system according to a first embodiment.

To begin with, a relevant technology will be described first only for understanding the following embodiments. In a circumstance, it is conceivable that a communications carrier, which is a telecommunication company that provides infrastructure for wireless mobile communication, may differ in different regions and countries. It is also assumed that there are multiple communication carriers in each country, and the communication carriers used by each vendor are different. Under such circumstances, when a vehicle travels across multiple regions or countries, it is desirable to be able to smoothly communicate with carriers in each of the regions, which means to smoothly update application program.

The present disclosure has been made in view of the above circumstances, and one objective thereof is to provide a vehicle data communication device that can easily acquire update data of an electronic control unit from a communication carrier even when the vehicle travels across a plurality of regions. Another object thereof is to provide a corresponding center device for communicating with the vehicle data communication device, a data communication method thereof, and a computer-readable non-transitory tangible storage medium storing a corresponding computer program.

In this configuration, even when the vehicle moves across regions, the client selection unit (i) selects one of the plurality of communication clients that corresponds to the communication carrier and the region that are specified by the acquired information and (ii) activates the selected one of the plurality of communication clients, thereby enabling data communication with the corresponding distribution server in the respective region. Therefore, the vehicle data communication device can acquire update data for the electronic control unit in a destination area without the need for the user to consider the travelling state of the vehicle.

According to a second aspect of the present disclosure, the communication control unit controls the transition state between four phases of (1) checking data update, (2) downloading, (3) installing, and (4) activating in data communication with the distribution server. When the client selection unit switches and activates a communication client at the phase (2) or (3), the data communication is re-executed from the phase (1).

That is, when the communication client is switched while the data communication with the distribution server is in the downloading or installing phase, interruption of acquiring update data and writing the update data into the electronic control device is likely to occur. Therefore, the communication control unit acquires the update data by re-executing by the distribution server and the switched communication client from the data update.

According to a third aspect of the present disclosure, the communication control unit continuously executes data communication to the current phase when the client selection unit switches and activates a communication client at the same time as in the second aspect. That is, even if the OTA client is switched when the data communication with the distribution server is at the downloading phase or the installing phase, it is not necessary to retry from the data update check, and the switched communication client is continuously executed. As a result, it is possible to avoid an increase in data communication amount between the distribution server and the communication client.

Next, a plurality of embodiments will be described with reference to the drawings.

First Embodiment

As shown in FIG. 1, a multiple OTA vendors system 1 of the present embodiment includes an OTA center 2, as a center device, and a vehicle system 3. The vehicle system 3 includes a DCM (Data Communication Module) 4, a CGW (Central Gate Way) 5, and a plurality of electronic control units (ECUs) 6. In FIG. 1, three ECUs 6, which are electronic control units, are shown as three targets for updating an application program. In actual environment, more ECUs 6 are equipped to the vehicle.

DCM 4 is a vehicle communication device for data communication with the OTA center 2 via a mobile communication network, for example, a mobile object communication network such as a 4G line, the Internet, and Wi-Fi (Wireless Fidelity (registered trademark)). When the DCM 4 downloads a distribution package from the OTA Center 2, the DCM 4 extracts write data from the distribution package and transfers the extracted data to CGW 5. The CGW 5 then writes the data into the ECU 6, which is a writing target.

In the OTA center 2, a WEB portal 21 inquiries to a OEM (Original Equipment Manufacturer) operator 22 whether or not the application program has been updated, and when yes, the content of the update is reflected in a distribution server 23. FIG. 1 shows, for example, three distribution servers (1) to (3) corresponding to three OTA vendors. The OEM operator 22 may exist individually, corresponding to each of the three OTA vendors, or may operate the three OTA vendors collectively.

The DCM 4 includes OTA clients (1) to (3) 7 corresponding to the distribution servers (1) to (3) 23, respectively. The OTA client 7 is a software having a function of wirelessly communicating with the OTA center 2 and downloading the distribution package via the distribution server 23. The downloaded distribution package is transferred to an in-vehicle cooperation unit 9 via an OTA sequence control unit 8. The OTA sequence control unit 8 is an example of a communication control unit, and the OTA client 7 is an example of a communication client.

The DCM 4 includes an OTA vendor switching control unit 10, a database 11, and a communication information acquisition unit 12. The communication information acquisition unit 12 is a wireless communication interface that performs, for example, LTE (Long Term Evolution) communication with the outside separately from the OTA client 7. The communication information acquisition unit 12 can acquire information such as connection carrier information (Mobile Network Code) and country information (Mobile Country Code) by performing LTE communication with a communication carrier in each region.

Figure 2:
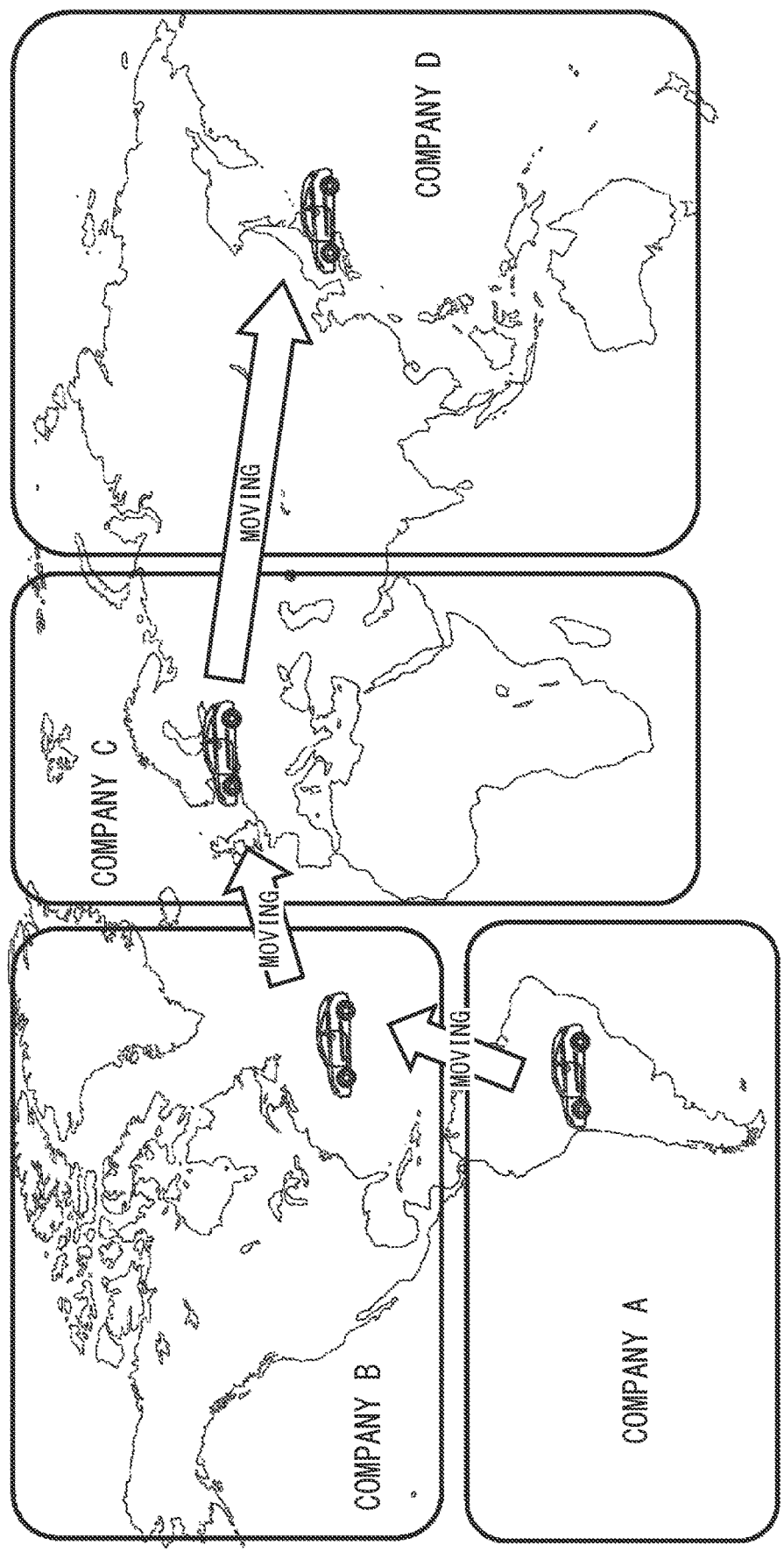
FIG. 2 is a diagram illustrating a change of the corresponding OTA vendor as the vehicle travels between a plurality of regions.
Figure 3:
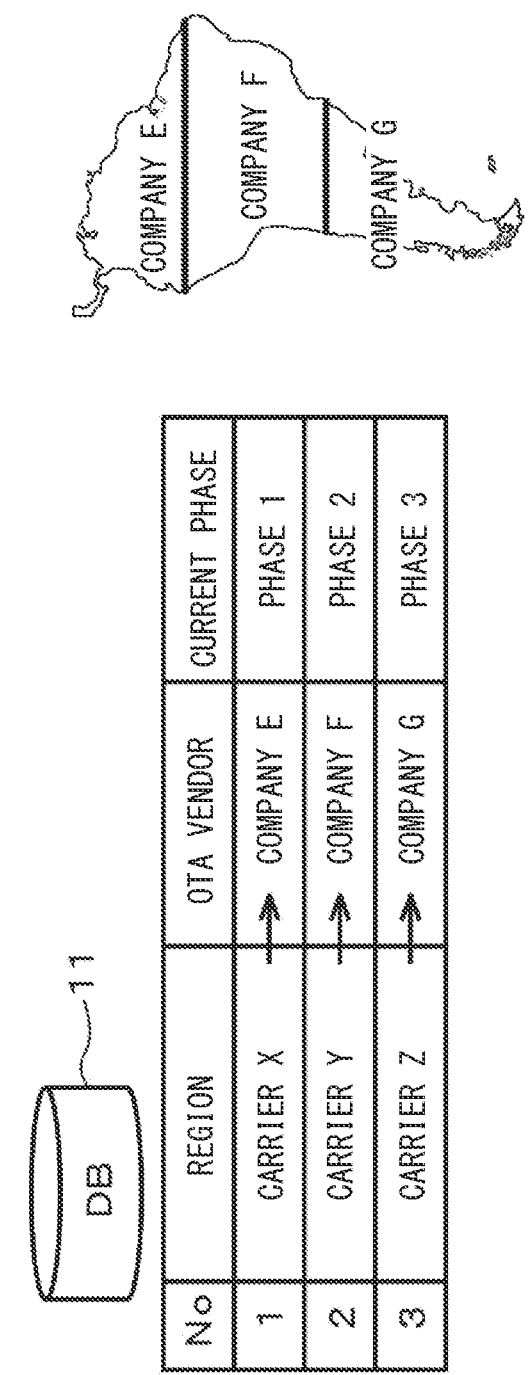
FIG. 3 is a diagram illustrating an example of the OTA vendor corresponding to each region and a phase of each of the OTA vendor.

As shown in FIGS. 2 and 3, the database 11 stores information indicating which OTA vendor should be used in the corresponding region. It should be noted that FIGS. 2 and 3 are different examples. Then, when the OTA vendor switching control unit 10 acquires connection carrier information and country information from the communication information acquisition unit 12, the OTA vendor switching control unit 10 acquires such information from the database 11. Next, the OTA client 7 corresponding to the distribution server 23 adopted by the OTA vendor in the region is enabled (activated) via the OTA sequence control unit 8. The OTA vendor switching control unit 10 is an example of a client selection unit, and the database 11 is an example of a client storage unit.

The in-vehicle cooperation unit 9 is an interface for in-vehicle communication with the CGW 5, and has functions such as "vehicle information acquisition", "command control", and "CAN/Eth communication", etc. "CAN" is a registered trademark of ROBERT BOSCH GmbH, "Eth" is an abbreviation for "Ethernet", and "Ethernet" is a registered trademark of Fuji Xerox Co., Ltd. The CGW 5 is also a reprogramming master that writes data into the target ECU 6 as described above, and communicates with the ECU 6 and the in-vehicle cooperation unit 9 to perform functions such as "vehicle information acquisition", "ECU reprogramming control" and "power control", etc. The CGW 5 updates the application program of the target ECU 6, which is the rewrite target ECU, by using the distribution package transferred from the in-vehicle cooperation unit 9, via the "ECU reprogramming control" function. The vehicle system 3 is an example of the data communication device.

Next, an operation of the present embodiment will be described. As shown in FIG. 3, for example, there are three regions NO. 1: Northern, NO. 2: Middle, and NO. 3: Southern, corresponding carriers X, Y, and Z, and corresponding OTA vendors E, F, and G, respectively. Regarding the phase (or the state) of OTA implementation, there are following Phases 1 to 4.

Phase 1: Check the distribution server for updates
Phase 2: Download
Phase 3: Install
Phase 4: Activate.

Figure 5:
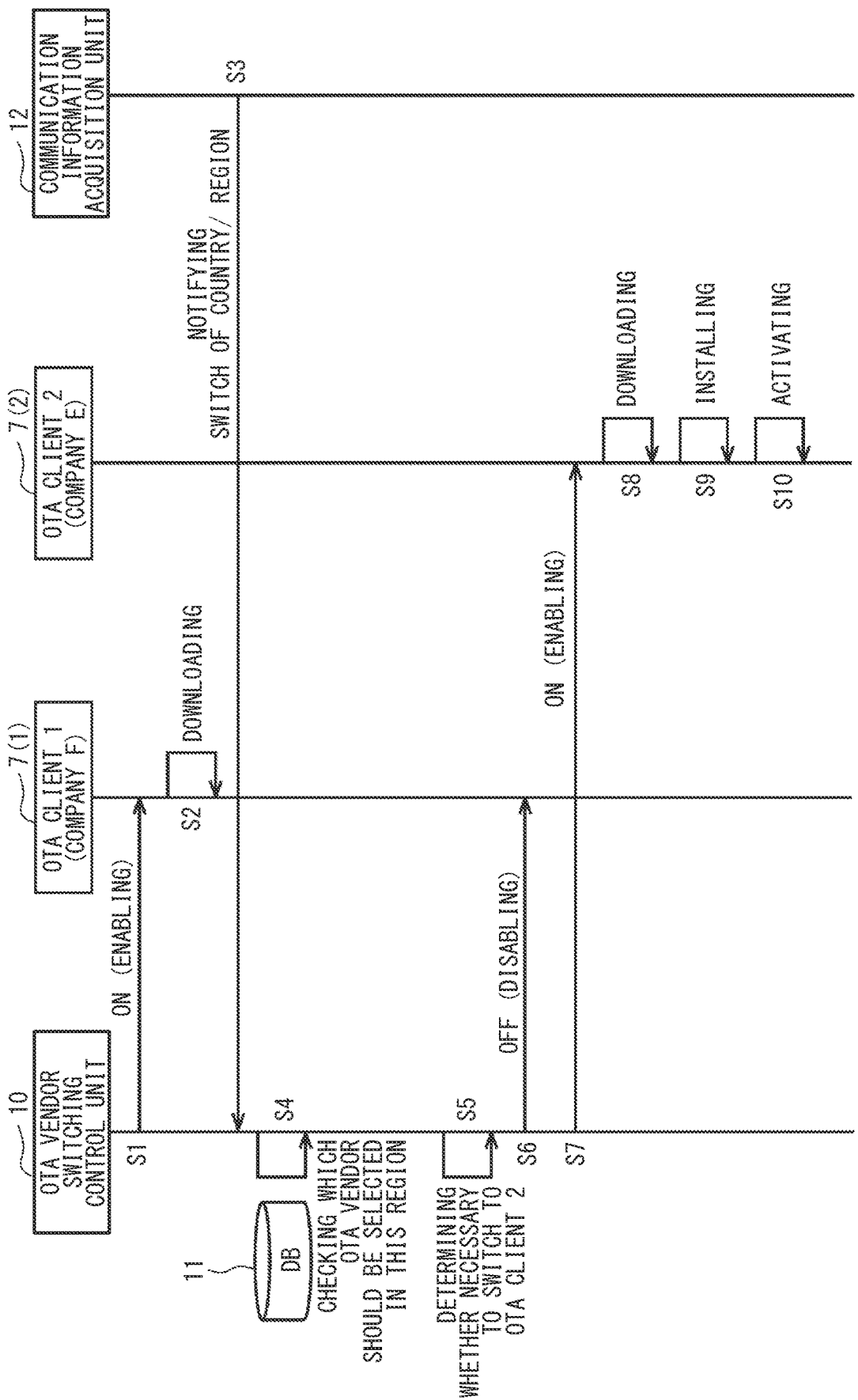
FIG. 5 is a sequence diagram showing a process of FIG. 4.

As shown in FIG. 5, for example, initial state of the region is "No. 2", and the OTA vendor switching control unit 10 activates the OTA client (1) 7 corresponding to the OTA vendor: Company F (S1). When the OTA client (1) 7 is activated, it communicates with the distribution server (1) 23, and although not shown, checks with the distribution server (1) 23 whether a program update is available. If there is a program update, the distribution package is downloaded (2). At this stage, when the communication information acquisition unit 12 acquires country information and recognizes that the region has been switched to "No. 1", it notifies the OTA vendor switching control unit 10 (S3) of the region change.

Then, the OTA vendor switching control unit 10 accesses the DB 11, and checks which OTA vendor should be selected in Region No. 2 (S4). Since the OTA vendor in Region No. 1 is Company E, the switching control unit 10 determines that it is necessary to switch to OTA client (2) 7 (S5). Therefore, the OTA vendor switching control unit 10 disables the OTA client (1) 7 (S6) and then activates the OTA client (2) 7 (S7).

The OTA client (2) 7 checks with the distribution server (2) 23 whether a program update is available, and when there is a program update, the distribution package is downloaded (S8). Thereafter, installation (S9) and activation (S10) are executed, and the OTA vendor switching control unit 10 recognizes the transition between the phases.

Figure 4:
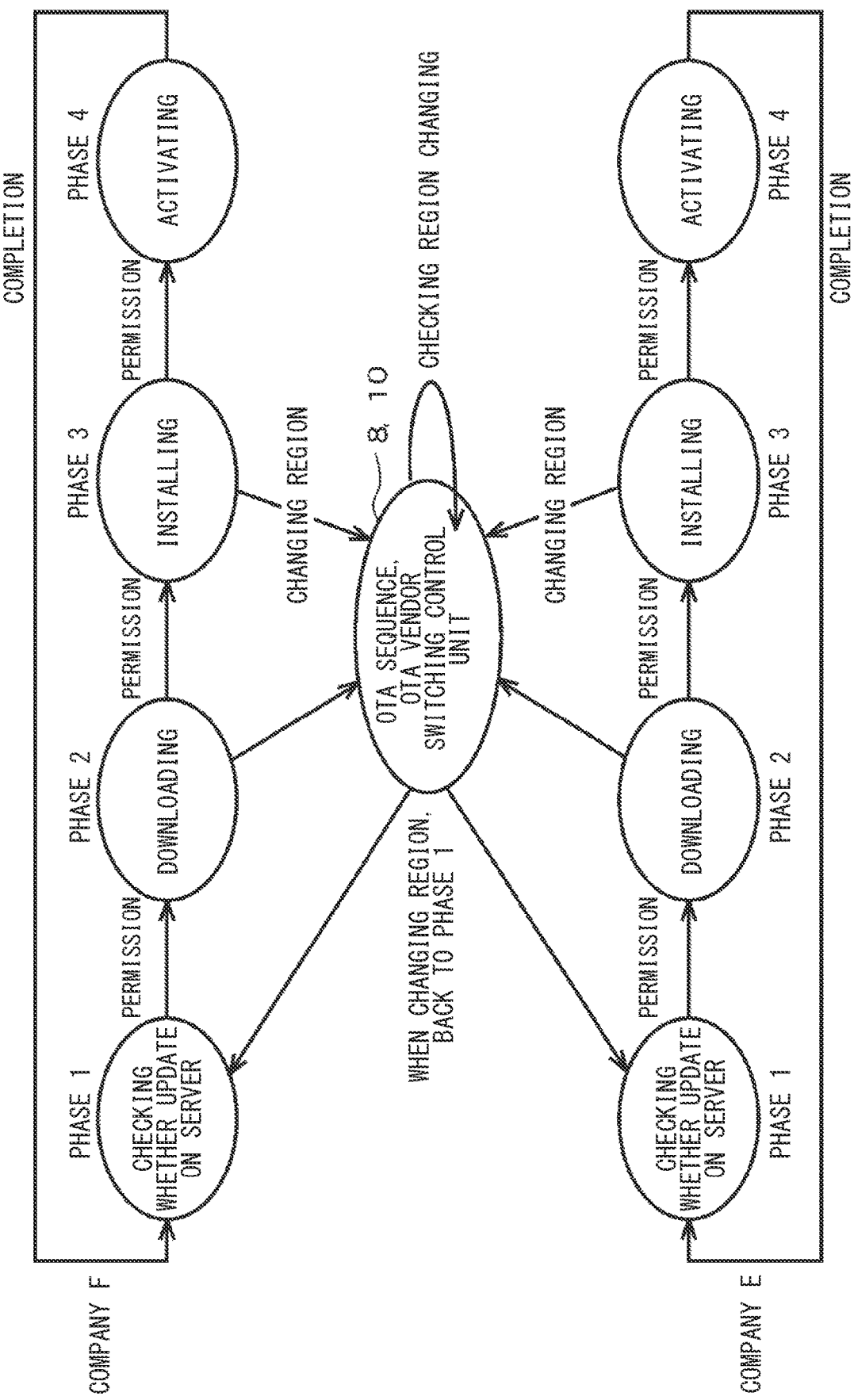
FIG. 4 is a diagram illustrating an example of changing the phases of two OTA vendors across two regions.

As shown in FIG. 4, for each OTA vendor, the phase transition occurs in an order of Phases 1 to 4 while confirming the user's permission at each transition between the phases. In the present embodiment, for example, when a region change occurs at Phase 3 and the OTA vendor is switched, the OTA sequence control unit 8 returns to Phase 1 and restarts the process from checking update.

As described above, the OTA clients 7 use the line of the communication carrier to wirelessly communicate with the center device 2 and thereby acquires the update data to be written into the plurality of ECUs 6. The information acquisition unit 12 uses wireless communication to acquire the information regarding the communication carrier and the region in which the center device 2 is located. The database 11 stores a plurality of communication clients that respectively correspond to different distribution servers (1)-(3) 23. On the basis of the information acquired by the communication information acquisition unit 12, the OTA vendor switching control unit 10 selects and activates one of the OTA clients 7 that corresponds to the communication carrier and the region from the database 11, thereby making it possible for data communication with the distribution servers 23.

In this configuration, even when the vehicle moves across regions, the OTA vendor switching control unit 10 selects and activates one of the OTA clients 7 corresponding to the communication carrier and the region specified by the acquired information, thereby enabling data communication with the distribution server 23 in each region. Therefore, the vehicle system 3 can acquire the update data for the ECUs 6 in the destination area without considering a travelling state of the vehicle.

When the OTA vendor switching control unit 10 switches and activates the OTA client 7 at the downloading phase (2) or the installing phase (3), the OTA sequence control unit 8 re-executes the data communication of the distribution server 23 from the downloading phase (1).

That is, when the OTA client 7 is switched while performing the data communication with the distribution server 23 at the downloading or installing phase, interruption of acquiring the update data and writing the update data into the ECU 6 is likely to occur. Therefore, the OTA sequence control unit 8 acquires the update data by retrying by the distribution server 23 and the switched OTA client 7 from the data update check.

Second Embodiment

Figure 6:
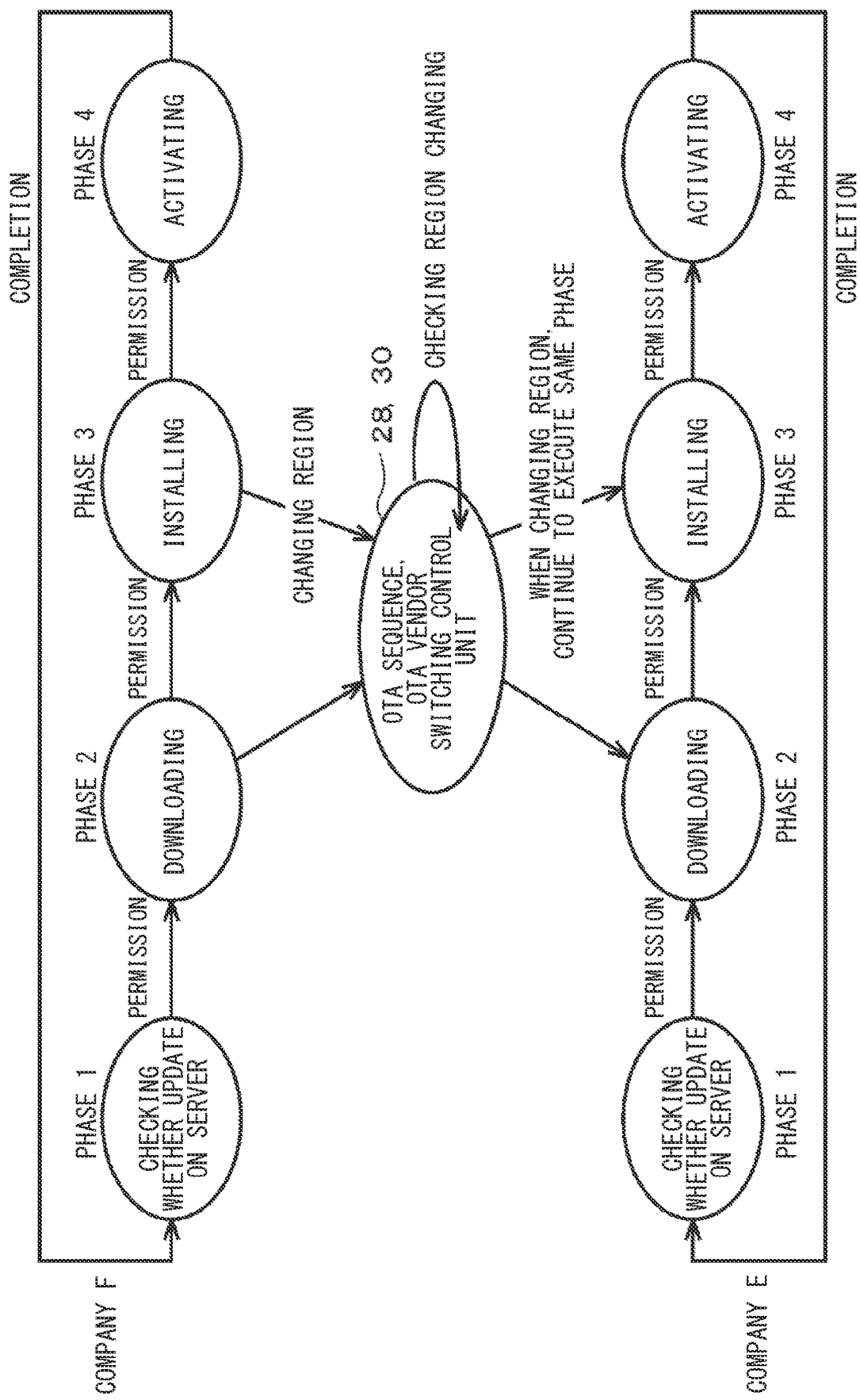
FIG. 6 is a diagram illustrating an example of changing the phases of the two OTA vendors across two regions according to a second embodiment.

Hereinafter, the identical parts as those in the first embodiment will be designated by the same reference numerals for simplification of the description. Only differences from the first embodiment will be described below. In the second embodiment, the phase transition by the OTA sequence control unit 28 and the switching control unit 30 shown in FIG. 6 is different from that of the first embodiment. For example, when communicating with Company F and region transition occurs at "Phase 3: installation", the OTA sequence control unit 28 continuously executes the same "Phase 3: installation" at which the OTA vendor is switched to Company E.

Figure 7:
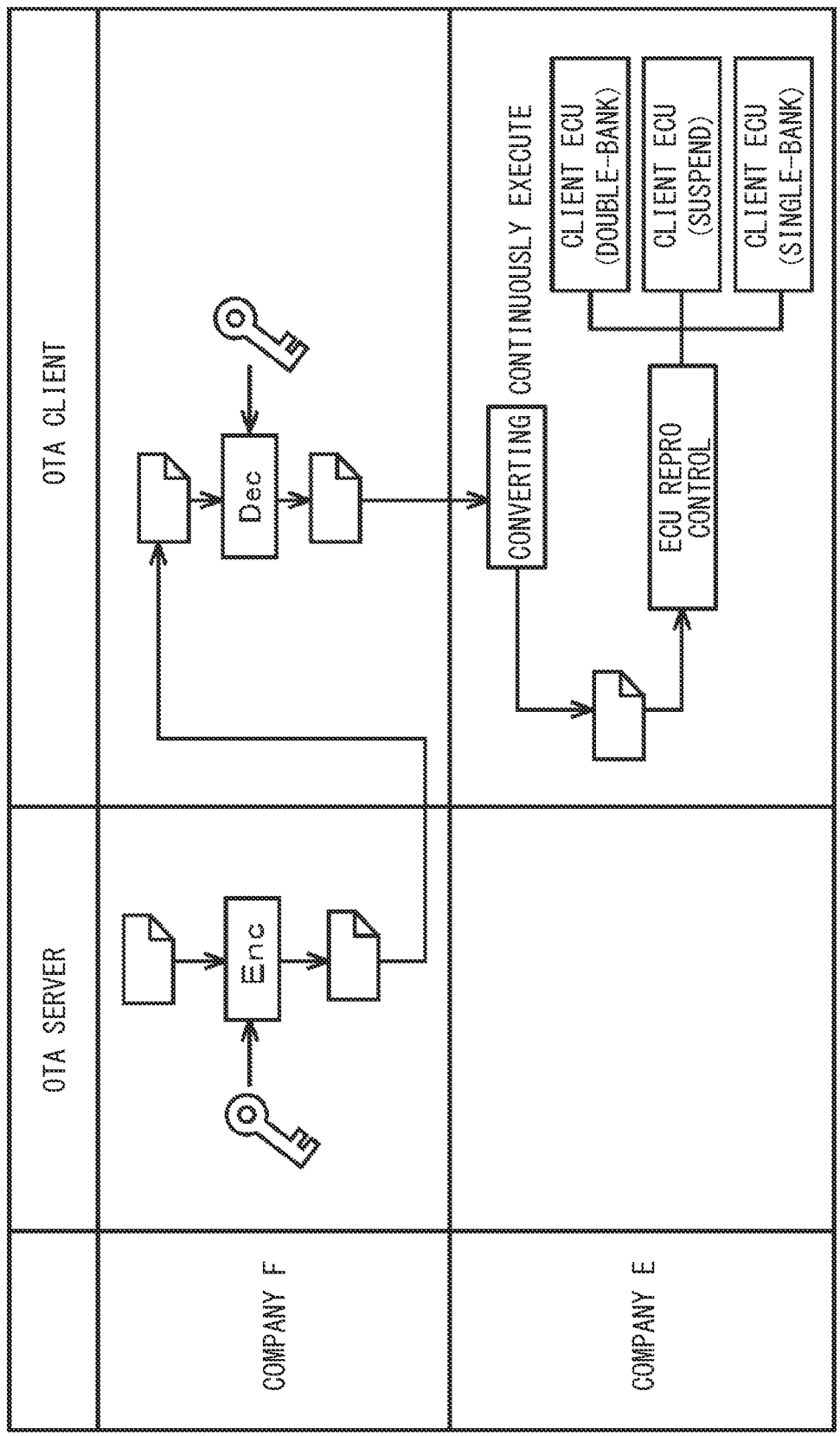
FIG. 7 is a diagram illustrating format conversion of metadata included in a distribution package when changing the OTA vendor from company E to company F.

As shown in FIG. 7, an encryption key and a signature key used when transmitting/receiving the distribution package is different for each OTA vendor. The rewriting operation/procedure for rewriting the target ECUs is different for each OTA vendor, and the content and format of the metadata, which is specification data that defines the operation of rewriting, also differs for each OTA vendor. Therefore, when the OTA vendor is changed from Company F to Company E, it is necessary to perform format conversion of the metadata, which is the specification data, included in the distribution package. The metadata provided by the OEM includes information related to rewriting of an application program, information for specifying the rewrite target ECU, information for specifying a rewrite order when there are a plurality of rewrite target ECUs, and data defining behavior involved in the rewriting.

Figure 8:
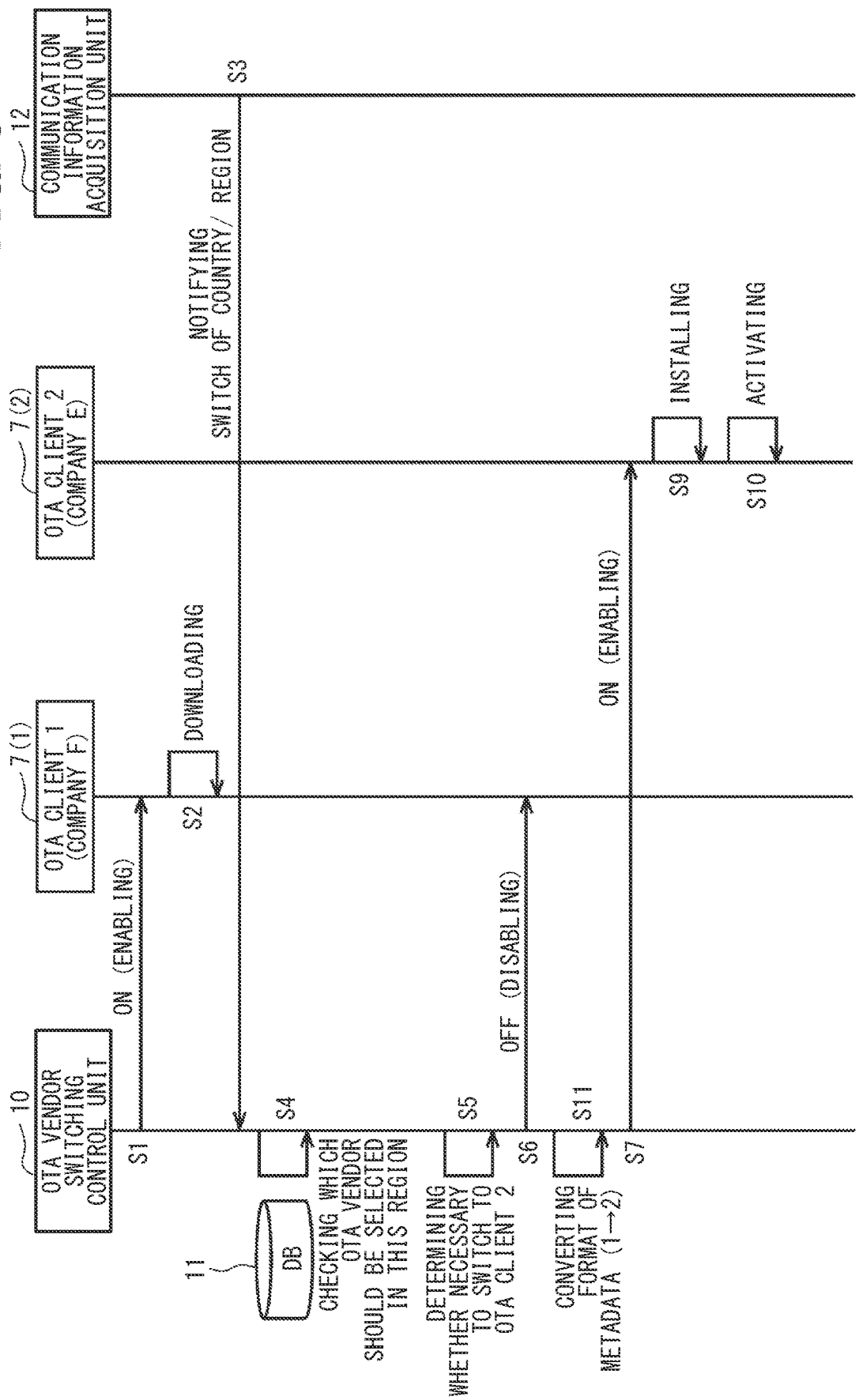
FIG. 8 is a sequence diagram showing a process of FIG. 6.

In the sequence shown in FIG. 8, steps S1 to S6 are performed in the same manner as in the first embodiment. In this example, since "Phase 2: Download" is completed, when a metadata format conversion process is performed (S11), installation (S9) and activation (S10) are executed after step S7.

Figure 9:
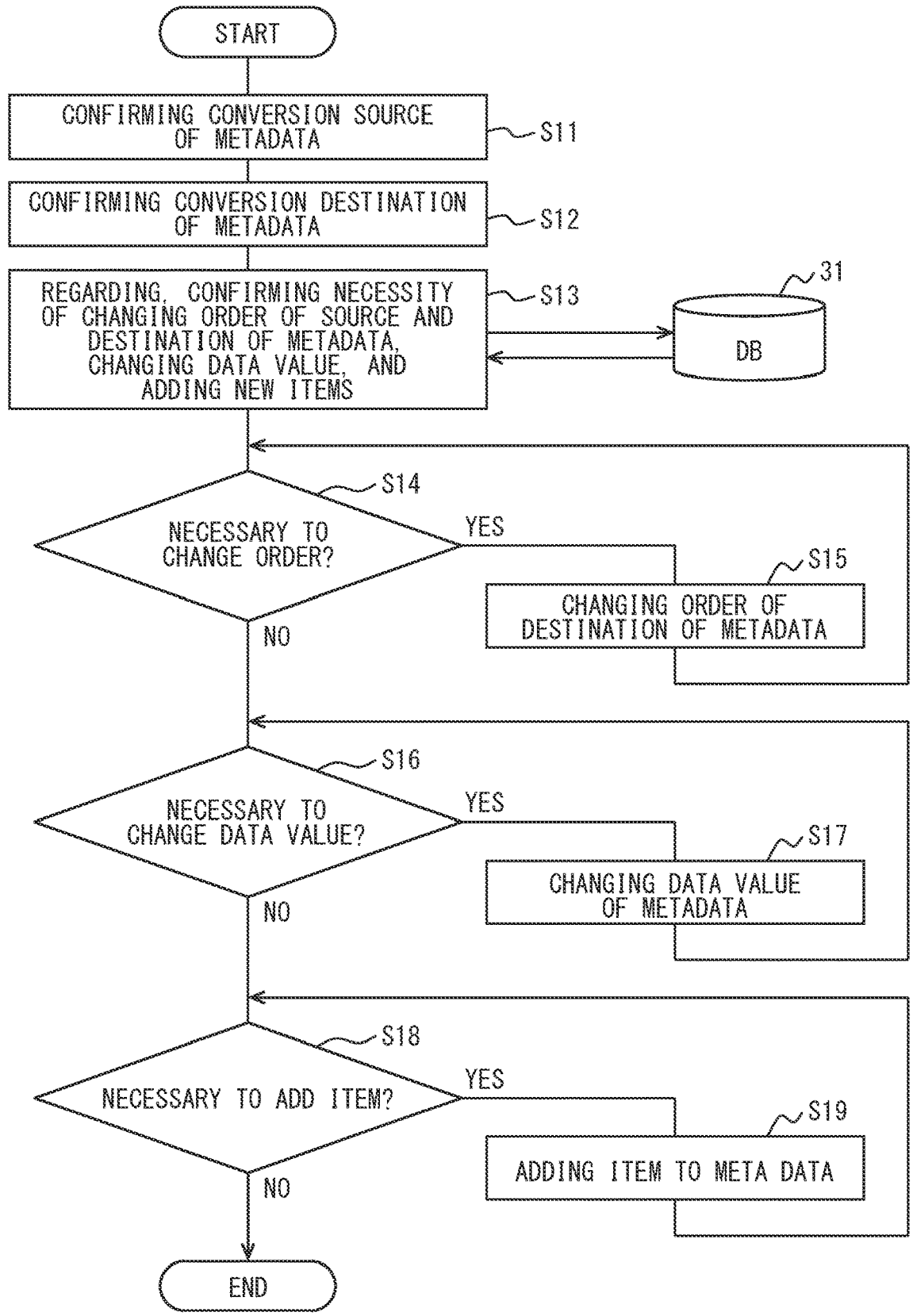
FIG. 9 is a flowchart showing a process of FIG. 8.

Next, the metadata format conversion process will be described. As shown in FIG. 10, the format conversion process includes (1) rearranging the order of items, (2) converting data values, and (3) adding the number of items. As shown in FIG. 9, the OTA vendor switching control unit 30 first confirms a conversion source and a conversion destination of the metadata (S11, S12). In the example shown in FIG. 10, the conversion source is Company F and the conversion destination is Company E.

Subsequently, the OTA vendor switching control unit 30 accesses another database 31 instead of the database 11 and confirms the conversion source, the items in which the order should be changed for the conversion destination the items in which the data value should be changed for the conversion destination, and the necessity of adding any item for the conversion destination (S13). That is, the information necessary for these conversion processes is stored in advance in the database 31. The database 31 is also a part of the client selection unit. When the order needs to be changed (S14; YES), the order of the items for the conversion destination in the metadata is changed (S15), and when the data value needs to be converted (S16; YES), the data value is converted (S17). When it is necessary to add an item (S18; YES), the item is added (S19).

In the example shown in FIG. 10, the order of the item "rewriting environment" is changed from the first order to the third order, the data value of the item "data recognition" is changed, and the item "the number of target ECUs" is added. The metadata includes information related to the update data for the ECU to be rewritten, type information indicating the type of the ECU, and attribute information indicating the attribute of the ECU. The type information is an identification (ID) for device identification, indicating the type of each ECU device. The attribute information is information indicating a hardware attribute and a software attribute regarding the ECU. For example, "update program size" is an example of software attribute information. "Power control information" is an example of hardware attribute information.

As described above, according to the second embodiment, when the OTA switching control unit 30 switches and activates the OTA client 7, the OTA sequence control unit 28 continuously executes the data communication from the current phase at which the switching and activating occurs. That is, even if the OTA client 7 is switched when the data communication with the distribution server 23 is at the downloading phase or the installing phase, it is not necessary to retry from the data update check. That is, the current phase can be maintained, and thus it is possible to avoid an increase in data communication amount between the distribution server 23 and the OTA client 7.

Then, the database 31 stores the specification data including the information about the update target ECU and the update data related information of the ECU. When the OTA vendor switching control unit 30 switches to and activates the OTA client 7, the format of the stored specification data before switching is converted into a format in compliant with the switched OTA client 7. As a result, the OTA vendor can continuously execute the phase before and after switching.

Third Embodiment

Figure 11:
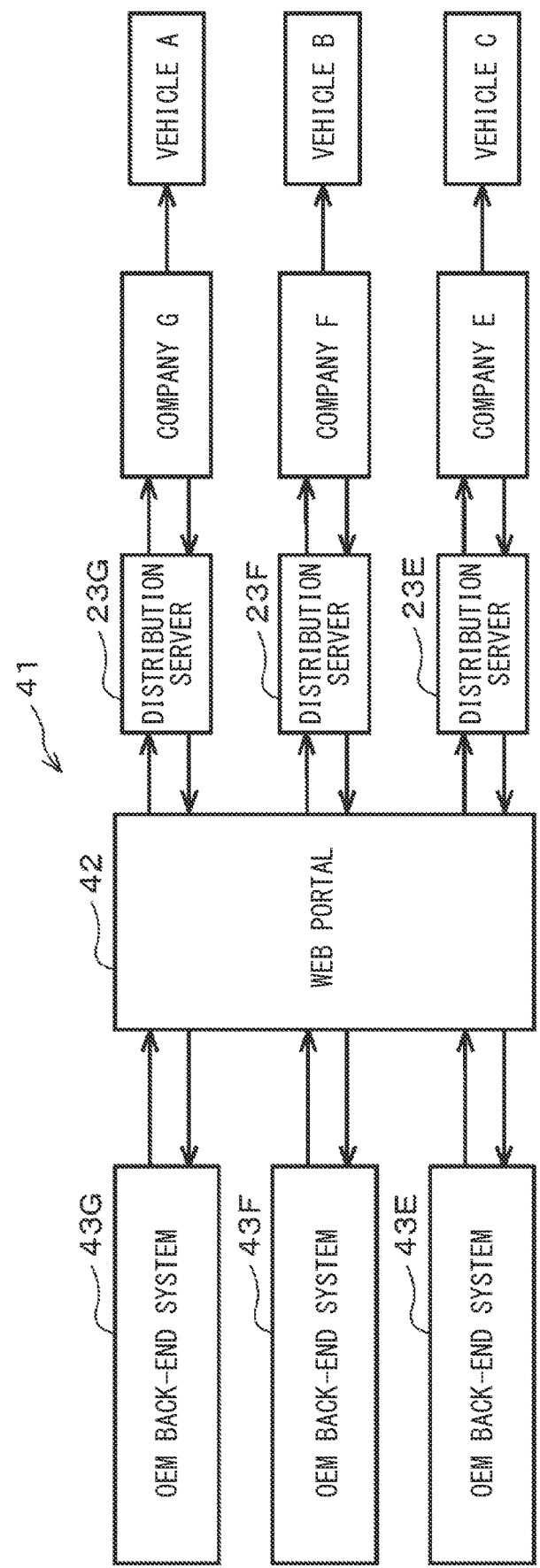
FIG. 11 is a circuit diagram showing a configuration of a multiple OTA vendors system according to a third embodiment.

As shown in FIG. 11, the third embodiment relates to a process performed on the center device 41 instead of the center device 2. OEM back-end systems 43G to 43E, which are replacement of the OEM operator 22 as described above, are connected to a WEB portal 42. The OEM back-end systems 43G to 43E are systems that manage the software of each vehicle model in each OEM, and when an operator selects the software to be updated, the systems 43G to 43E forwards the software to the corresponding distribution servers 23G to 23E via the WEB portal 42.

Figure 12:
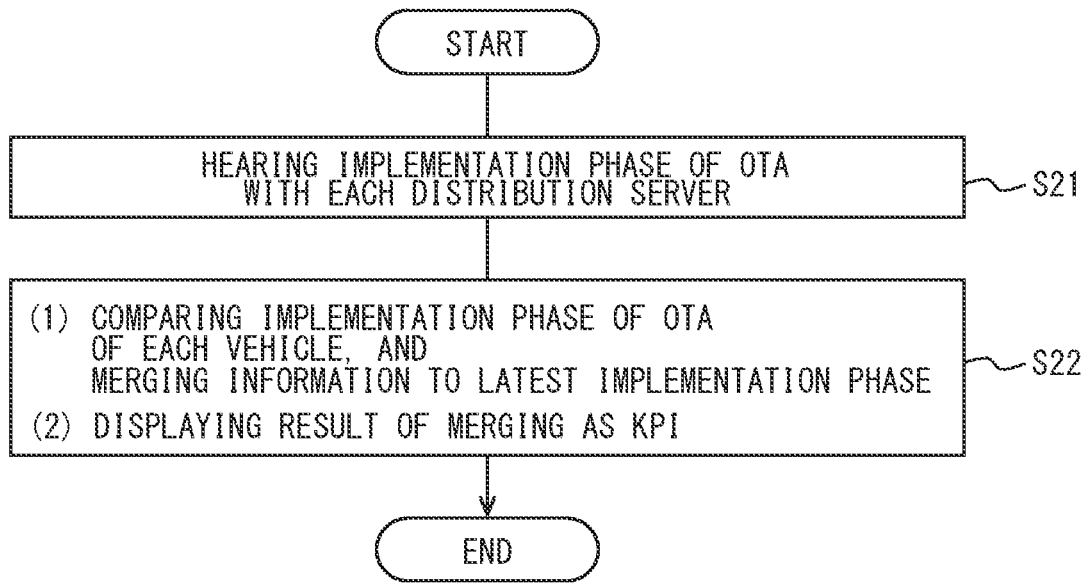
FIG. 12 is a flowchart showing a process performed by a web portal.

In the third embodiment, as shown in FIG. 12, the WEB portal 42 hears the implementation phase of OTA for each distribution server 23G to 23E, that is, the update status of the program for each vehicle (S21). The distribution server 23 is an example of a log information storage unit. Then, the OTA implementation phase of each vehicle is compared, and as shown in FIG. 13, the OTA phase implemented at the latest time is selected, and the information is merged, the merged result is displayed on the display or the like as KPI information (S22). The WEB portal 42 is an example of the information processing unit.

As described above, according to the third embodiment, in the center device 41, the distribution server 23 stores the log information of the execution date and time of the phases (2) to (4) regarding a program update transmitted from the DCM 4. The web portal 42 merges a plurality of pieces of log information for each of a plurality of vehicles into the latest information, if the plurality of pieces of log information stored for each of the plurality of communication clients in the distribution server 23 due to switching and activating of the communication client by the OTA vendor switching control unit 30. As a result, the user can grasp the latest OTA implementation phase for each vehicle by referring to the KPI information which is the merged log information.

Other Embodiments

Although DCM 4 and CGW 5 are separated, they may be configured as an integrated ECU, or the functional part for communication of DCM 4 and CGW 5 may be configured as separated, and the other functional parts may be configured as an integrated ECU. The function of the DCM 4 in this embodiment may be implemented in the CGW 5.

Although the present disclosure has been made in accordance with the embodiments, it is understood that the present disclosure is not limited to such embodiments and configurations. The present disclosure incorporates various modifications and variations within the scope of equivalents. In addition, the present disclosure also includes various combinations and configurations, as well as other combinations and configurations that include only one element, more, or less within the scope and spirit of the present disclosure.

In the above embodiment, each of the control unit may be provided separately as one or more than one controller or may be provided integrally as one or more than one controller. Such a controller and method thereof described in the present disclosure may be implemented by one or more than one special-purpose computer. Alternatively, the control unit described in the present disclosure and the method thereof may be realized by a dedicated computer configured as a processor with one or more dedicated hardware logic circuits. Alternatively, the control unit and the technique according to the present disclosure may be achieved using one or more dedicated computers constituted by a combination of the processor and the memory programmed to execute one or more functions and the processor with one or more hardware logic circuits. Further, the computer program may be stored in a computer-readable non-transitory tangible storage medium as instructions executed by a computer.

The invention claimed is:

1. A vehicle data communication device mounted in a vehicle having a plurality of electronic control units, the vehicle data communication device configured to wirelessly communicate data with a center device, the vehicle data communication device comprising:
   a plurality of communication clients each pairing with a respective one of a plurality of distribution servers included in the center device;
   a communication information acquisition unit acquiring information of a communication carrier and a region in which the center device is located via wireless communication using a line of the communication carrier;
   a client storage unit storing the plurality of communication clients each of which corresponds to the corresponding one of the plurality of distribution servers;
   a client selection unit (i) selecting, from the client storage unit based on the information acquired by the communication information acquisition unit, one of the plurality of communication clients that corresponds to the communication carrier and the region that are specified by the information and (ii) activating the selected one of the plurality of communication clients to enable data communication with the corresponding distribution server; and
   a communication control unit controlling transition between a plurality of phases in data communication with the distribution server, the plurality of phases including:
      (1) checking data update;
      (2) downloading update data;
      (3) installing by writing downloaded data into the electronic control units; and
      (4) activating installed data, wherein the selected communication client is configured to acquire, based on the plurality of phases, update data to be written into the plurality of electronic control units when activated by the client selection unit; and the communication control unit continuously executes data communication from the phase (3) to the phase (4) when the client selection unit switches and activates the communication client at the phase (3) after downloading the update data is completed.

2. The vehicle data communication device according to claim 1, wherein the communication control unit re-executes data communication from the phase (1) when the client selection unit switches and activates the communication client at the phase (2) or (3).

3. The vehicle data communication device according to claim 1, wherein:

a target device is a target for data update among the plurality of electronic control units, the client selection unit stores specification data including information regarding the target device and information related to the update data for the target device, and when the communication client is switched and activated, the client selection unit is configured to switch a format of the specification data that was stored before switching to another format of the specification data in conformity with the communication client that is activated after switching.

4. The vehicle data communication device according to claim 3, wherein the client selection unit stores the specification data including a type of the target device, an attribute of the target device, and information indicating rewriting environment for data update of the target device.

5. The center device configured to communicate data with the vehicle data communication device according to claim 1, the center device comprising:

the plurality of distribution servers;

a log information storage unit storing log information of execution dates and times at which the phases (2)-(4) are executed, the log information being transmitted by the vehicle data communication device; and an information processing unit processing the log information, wherein if the log information storage unit stores a plurality of pieces of the log information for each of a plurality of vehicles corresponding to the plurality of communication clients due to switching and activating of the communication client by the client selection unit, the information processing unit is configured to merge the plurality of pieces of the log information for each of the plurality of vehicles into a latest one of the plurality of pieces of the log information.

6. A method for data communication between the plurality of distribution servers and the vehicle data communication device according to claim 1, the method comprising:

storing, in a log information storage unit, log information of execution dates and times at which the phases (2)-(4) are executed, the log information being transmitted by the vehicle data communication device; and if the log information storage unit stores a plurality of pieces of the log information for each of a plurality of vehicles corresponding to the plurality of communication clients due to switching and activating of the communication client by the client selection unit, merging the plurality of pieces of the log information for each of the plurality of vehicles into a latest one of the plurality of pieces of the log information.

7. A computer-readable non-transitory tangible storage medium storing a program, executed by the center device including the distribution server, for data communication between the center device and the vehicle data communication device according to claim 1, the program comprising instructions, when executed by the center device, causing the center device to:

store log information of execution dates and times at which the phases (2)-(4) are executed in a log information storage unit, the log information being transmitted by the vehicle data communication device; and if the log information storage unit stores a plurality of pieces of the log information for each of a plurality of vehicles corresponding to the plurality of communication clients due to switching and activating of the communication client by the client selection unit, merge the plurality of pieces of the log information for each of the plurality of vehicles into a latest one of the plurality of pieces of the log information.

8. A data communication method for wireless data communication by a vehicle data communication device mounted in a vehicle having a plurality of electronic control units, the vehicle data communication device configured to wirelessly communicate data with a center device, the vehicle data communication device comprising a plurality of communication clients each pairing with a respective one of a plurality of distribution servers included in the center device, the method comprising:

wirelessly acquiring information of a communication carrier and a region in which the center device is located via wireless communication using a line of the communication carrier;

storing the plurality of communication clients each of which corresponds to the corresponding one of the plurality of distribution servers;

(i) selecting, from the client storage unit based on the information acquired by the communication information acquisition unit, one of the plurality of communication clients that corresponds to the communication carrier and the region that are specified by the information and (ii) activating the selected one of the plurality of communication clients to enable data communication with the corresponding distribution server;

controlling transition between a plurality of phases in data communication with the distribution server, the plurality of phases including:

(1) checking data update;

(2) downloading update data;

(3) installing by writing downloaded data into the electronic control units; and (4) activating installed data;

acquiring, based on the plurality of phases, update data to be written into the plurality of electronic control units when activated by a client selection unit; and continuously executing data communication from the phase (3) to the phase (4) when the client selection unit switches and activates the communication client at phase (3) after downloading the update data is completed.

9. A computer-readable non-transitory tangible storage medium storing a program for a vehicle communication device mounted in a vehicle having a plurality of electronic control units, the vehicle data communication device configured to wirelessly communicate data with a center device, the vehicle data communication device comprising a plurality of communication clients each pairing with a respective one of a plurality of distribution servers included in the center device, the program comprising instructions, when executed by the vehicle communication device, causing the vehicle communication device to:

wirelessly acquire information of a communication carrier and a region in which the center device is located via wireless communication using a line of the communication carrier;

store the plurality of communication clients each of which corresponds to the corresponding one of the plurality of distribution servers;

(i) select, from the client storage unit based on the information acquired by the communication information acquisition unit, one of the plurality of communication clients that corresponds to the communication carrier and the region that are specified by the information and (ii) activate the selected one of the plurality of communication clients to enable data communication with the corresponding distribution server;

control transition between a plurality of phases in data communication with the distribution server, the plurality of phases including:
(1) checking data update;
(2) downloading update data;
(3) installing by writing downloaded data into the electronic control units; and
(4) activating installed data;

acquire, based on the plurality of phases, update data to be written into the plurality of electronic control units when activated by a client selection unit;

continuously execute data communication from the phase (3) to the phase 4 when the client selection unit switches and activates the communication client at phase (3) after downloading the update data is completed.

* * * * *